United States Patent
Clough

(10) Patent No.: US 6,820,124 B1
(45) Date of Patent: Nov. 16, 2004

(54) CRYPTOGRAPHIC AUTHENTICATION USING A NETWORK MANAGEMENT PROTOCOL

(75) Inventor: James Clough, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/469,732

(22) Filed: Dec. 21, 1999

(51) Int. Cl.[7] .............................................. G06F 15/16
(52) U.S. Cl. ...................... 709/229; 709/225; 709/237; 713/168; 380/285
(58) Field of Search ................................ 709/237, 229, 709/225, 227, 230, 232; 713/168, 150, 200, 201, 202; 380/281–285, 247

(56) References Cited

U.S. PATENT DOCUMENTS

| | | | | |
|---|---|---|---|---|
| 5,524,052 A | * | 6/1996 | Augustine et al. | 713/150 |
| 5,926,549 A | * | 7/1999 | Pinkas | 713/168 |
| 6,034,618 A | * | 3/2000 | Tatebayashi et al. | 340/5.8 |
| 6,044,468 A | * | 3/2000 | Osmond | 380/281 |
| 6,052,784 A | * | 4/2000 | Day | 713/156 |
| 6,070,245 A | * | 5/2000 | Murphy et al. | 380/239 |
| 6,215,878 B1 | * | 4/2001 | Harkins | 380/281 |
| 6,385,728 B1 | * | 5/2002 | DeBry | 709/229 |
| 6,408,392 B2 | * | 6/2002 | White | 713/187 |
| 6,487,592 B1 | * | 11/2002 | Sawyer et al. | 709/223 |
| 6,487,598 B1 | * | 11/2002 | Valencia | 709/227 |
| 6,493,825 B1 | * | 12/2002 | Blumenau et al. | 713/168 |
| 6,532,290 B1 | * | 3/2003 | Dent | 380/247 |

* cited by examiner

*Primary Examiner*—Ario Etienne
*Assistant Examiner*—Abdullahi E. Salad
(74) *Attorney, Agent, or Firm*—Matthew L. Wade

(57) ABSTRACT

A computer is provided that is able to participate in a challenge-response authentication routine by using a network management protocol. In one embodiment, a first computer issues a challenge to a second computer by transmitting an SNMP SetRequest message to the second computer. The SetRequest message includes a predetermined object identifier and a challenge block associated therewith. The second computer responds by transmitting an SNMP GetResponse message. The GetResponse message includes the object identifier and the response block associated therewith. The first computer receives this message and verifies the response block.

21 Claims, 3 Drawing Sheets

CRYPTOGRAPHIC AUTHENTICATION USING A NETWORK MANAGEMENT PROTOCOL

BACKGROUND OF THE INVENTION

The use of the Internet to carry out commercial transactions is rapidly growing. Unfortunately, the Internet is not a secure communication channel and this fact has raised concerns over the ability to securely perform these transactions. To address these concerns cryptographic techniques have been developed.

One such technique may be referred to herein as "challenge-response" authentication. Challenge-response authentication provides one computer with the ability to authenticate another computer over an unsecured network such as the Internet.

For example, consider the case wherein a vendor (computer A) wishes to transmit data to a customer's computer over an unsecured communication channel (e.g., the Internet). Before transmitting this data, the vendor wishes to verify that the receiving computer (computer B) is indeed an authorized computer (i.e., the customer's computer) and not a computer masquerading as the customer's computer. In order to accomplish this task a challenge-response authentication technique may be used.

In order to facilitate challenge-response authentication, it is assumed in this example that the vendor and customer have previously agreed on a public key cryptographic (crypto) algorithm, a public key and that the customer has been issued a private key. It is also agreed that a special purpose security protocol will be used as described below.

In order for computer A to verify that computer B is an authorized computer, computer A first generates a challenge block (i.e., a string of encrypted code). This is accomplished using the public key crypto algorithm. After the challenge block is generated, it is then transmitted to computer B over the communication channel by using the special purpose security protocol.

Computer B, in order to properly respond to receiving the challenge block, converts the challenge block into a "response block" (i.e., a second string of encrypted code). This is accomplished using the same public key crypto algorithm and the private key which was assigned to the customer. The response block is then transmitted back to the computer A by again using the special purpose protocol.

Upon receiving the response block, computer A processes it in order to determine (within a degree of certainty) that computer B is indeed in possession of the appropriate private key. This is accomplished by again using the public key crypto algorithm and the public key mentioned above.

As indicated above, prior art challenge-response authentication typically involves the use of a special purpose protocol that is used to transmit the challenge block and the response block from one computer to the other. Unfortunately, providing a computer with the ability to communicate using an additional protocol can add significant overhead and therefore costs to the computer. This is especially true for a computer having limited resources. For example, in some situations it is desirable to authenticate a printer over a network. Adding the software to enable the printer to communicate using a challenge-response protocol can result in occupying a significant portion of the printer's memory. As a result, the available memory that can be used for other purposes is reduced. This can result in reducing printer performance or having to purchase and then add additional memory to accommodate the additional software or both.

Accordingly, there is a need to authenticate a computer without having to implement an additional protocol to support the authentication.

SUMMARY OF THE INVENTION

Many networked computers include the ability to communicate by using a network management protocol. Such a protocol enables one computer to diagnose problems and gather certain statistics from another computer over a network for administration and fine tuning.

In an embodiment of the invention, a first computer is provided that is able to transmit a challenge request to a second computer by using a network management protocol. The second computer is able to respond to the request by also using the network management protocol. As a result, authentication is achieved by using a protocol that is likely to be already implemented on both computers for the primary purpose of achieving network management.

Thus, the present invention can be used to eliminate the need of having to implement a prior art challenge-response protocol in order to support challenge-response authentication. This can result in reducing system overhead and costs associated with providing a computer the ability to participate in challenge-response authentication.

The present invention may be implemented as a computerized method of transmitting a challenge block to a computer. The method includes the step of transmitting the challenge block, using a network management protocol message, to the computer. Preferably, the network management protocol is the simple network management protocol (SNMP). The at least one message may include an SNMP SetRequest message including the challenge block and an associated pre-determined object identifier. The method can also include the step of receiving a second SNMP message that includes the response block; verifying the response block; and if the response block is verified, then verifying the identity of the computer. The second SNMP message preferably is an SNMP GetResponse message that includes the response block and the pre-determined object identifier associated therewith.

The present invention may also be implemented as a first computer including means for receiving a network management protocol message. The message includes a challenge block, from a second computer; and means for responding to the message by using the challenge block to generate a response block. Preferably, the network management protocol is the simple network management protocol (SNMP) and the message is a SNMP SetRequest message. The SNMP SetRequest message including a pre-determined object identifier and the challenge block associated therewith. The computer may also include means for transmitting the response block, using the SNMP protocol, to the second computer. Preferably, the transmitting means includes means for transmitting a GetResponse message that includes the response block and the object identifier associated therewith to the second computer. Importantly, the first computer may be a network printer.

The present invention may also be implemented as a program storage medium readable by a first computer, tangibly embodying a program of instruction executable by the first computer to perform method steps for issuing a challenge to a second computer, the method steps include transmitting a network management protocol message that includes a challenge block to the second computer. Preferably, the network management protocol message is an SNMP SetRequest message that includes a pre-determined object identifier and the challenge block associated therewith. In addition, the method steps may also include the step of upon receiving a GetResponse message including the object identifier and a response block from the second computer, then verifying the response block.

Other aspects and advantages of the present invention will become apparent from the following detailed description, taken in conjunction with the accompanying drawings, illustrating by way of example the principles of the invention.

DETAILED DESCRIPTION OF THE INVENTION

As mentioned above, many networked computers include the ability to communicate by using a network management protocol. This protocol enables one computer to diagnose problems and gather statistics from another computer over a network for administration and fine tuning.

In an embodiment of the invention, a first computer is provided that is able to transmit a challenge request to a second computer by using a network management protocol. The second computer is able to respond to the request by also using the network management protocol. As a result, authentication is achieved by using a protocol that is likely to be already implemented on both computers for the primary purpose of achieving network management.

Thus, the present invention can be used to eliminate the need of having to implement an additional protocol (i.e., a prior art challenge-response protocol) in order to support challenge-response authentication. As a result, the system overhead and costs associated with implementing the additional protocol are eliminated.

Figure 1:
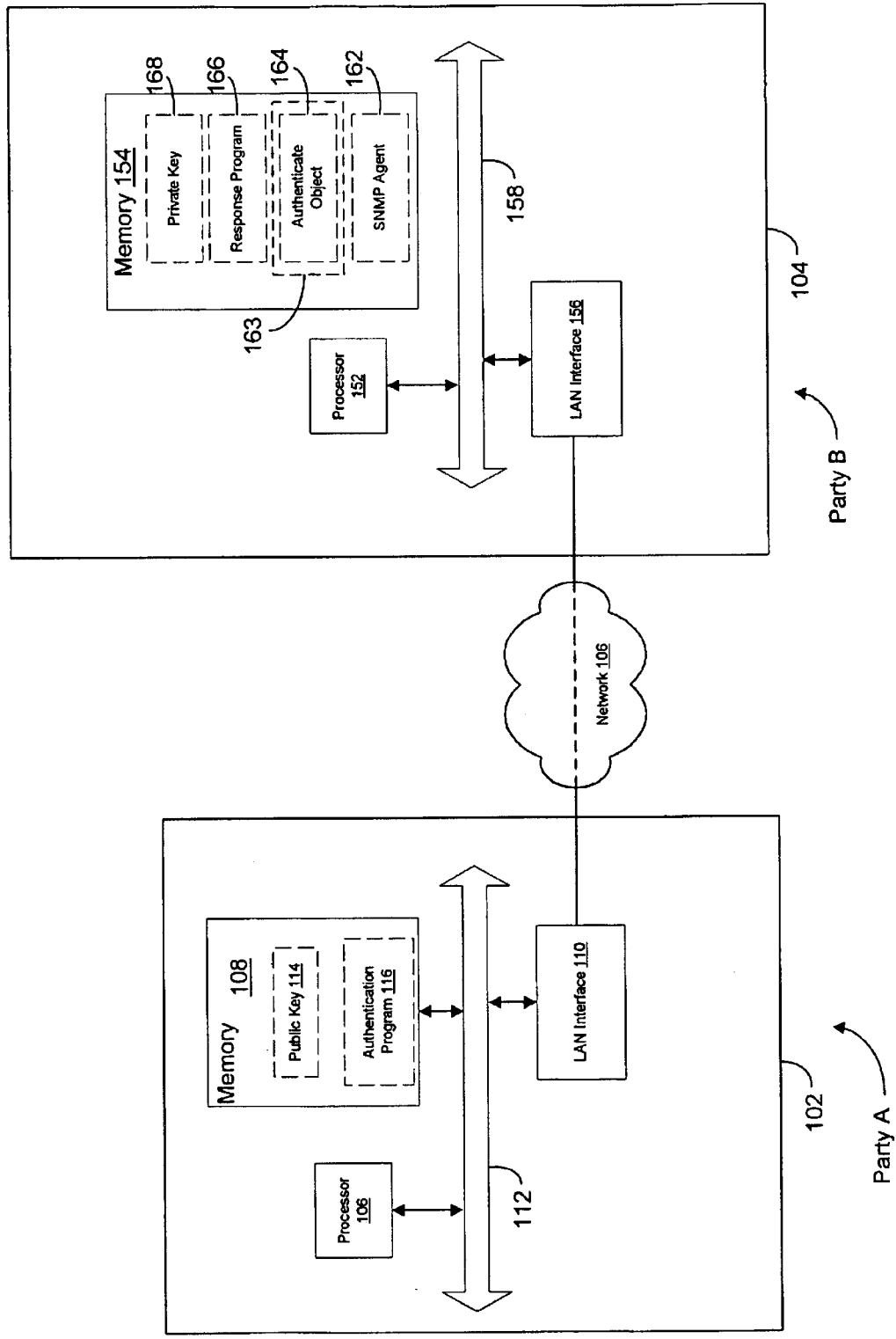
FIG. 1 illustrates a first computer and a second computer both embodying the invention.

As shown in FIG. 1, for purposes of illustration, the invention is embodied in the form of a first computer 102 and a second computer 104 each having the ability to communicate with the other via a network 106. The network 106 may be, for example, the Internet or an intranet. The computers may represent any type of computing device addressable over a network.

It is important to note for the later discussion that the second computer 104 incorporates the simple network management protocol (SNMP) for network control and monitoring. As is well known in the art, SNMP is a widely used protocol for network management and may be used to manage a wide range devices which are connected to a network. Version one of SNMP is described in Standard 15, RFC 1157.

As indicated in FIG. 1, the first computer 102 is maintained by party A and the second computer 104 is maintained by party B. It is assumed that party A wishes to transmit certain data to Party B's computer. Before transmitting this data, however, party A wishes to verify that the second computer 104 is an authorized computer (i.e., that computer 104 is indeed party B's computer). In order to accomplish this a challenge-response authentication technique is used.

As described above, challenge-response authentication involves the transmission of a challenge block and a response block. In the prior art, this is typically accomplished by use of a special purpose security protocol. As will be shown, in the present embodiment the challenge block and the response block are transmitted by using SNMP messages thereby eliminating the need (and the associated costs) to implement a special purpose security protocol.

In order to facilitate challenge-response authentication, it is assumed in this embodiment that party A and party B have previously agreed on the use of a public key cryptographic (crypto) algorithm and a public key 114. It is also assumed that party B has been issued a private key 168. It is noted that the public key crypto algorithm may be one of any number of suitable algorithms both currently known in the art or yet to be devised. One example of a suitable algorithm is the Rivest, Shamir, Adelman (RSA) algorithm.

As shown in FIG. 1, the first computer 102 includes a variety of basic components including a processor 106, a memory 108 and a network interface 110 all connected via a local interface 112. The local interface 112 may include, for example, one or more data buses with accompanying control buses. The network interface 110 links the local interface 112 to the network 106 and facilitates communications between the first computer 102 and other devices linked to the network 106. The processor 106 is used to execute software programs stored in the memory 108. In addition, the public key 114 is stored in the memory 108.

As shown in FIG. 1, one of the programs stored in the memory 108 is an authentication program 116. As will be described in greater detail below, the authentication program 116 enables the first computer 102 to perform a challenge-response authentication routine according to the principles of the present invention in order to authenticate the second computer 104. The operation of the first computer 102 while executing the authentication program 116 is explained in greater detail below and with reference to FIG. 2.

Similar to the first computer 102, the second computer 104 includes a processor 152, a memory 154 and a network interface 156 all connected via a local interface 158. The local interface 158 may include, for example, one or more data buses with accompanying control buses. The network interface 156 links the local interface 158 to the network 106 and facilitates communications between the second computer 104 and other devices linked to the network 106. The processor 152 is used to execute software programs stored in the memory 154.

As noted above, the second computer 104 incorporates SNMP. Accordingly, and as indicated in FIG. 1, stored in the memory 154 is an SNMP agent 162, and an SNMP Management information base (MIB) 163. In addition, a response program 166 and the private key 167 are also stored in the memory 154.

The MIB 163 may include a number of pre-defined objects that are managed in a standard manner by operation of the SNMP agent 162. According to the principles of the present invention, the MIB 163 also includes an authenticate object 164. It is important to note for the later discussion, that the authenticate object 164 is associated with the response program 166 so that the response program 166 is executed when the authenticate object 164 is set to a new value by the SNMP agent 162. As will be shown, this arrangement enables the second computer 104 to receive and to respond to a challenge-response authentication request by using SNMP messages.

Figure 2:
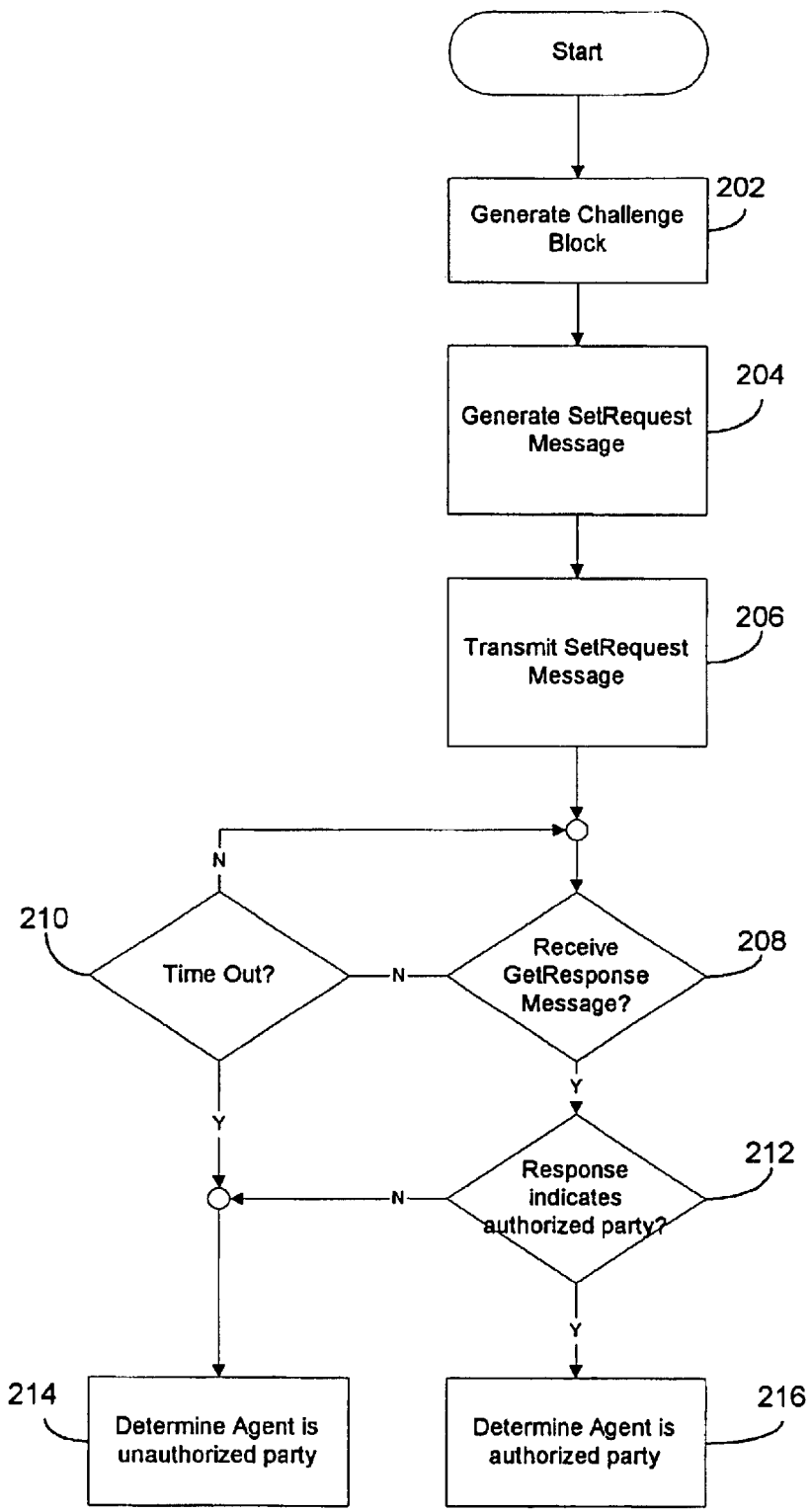
FIG. 2 is a flow chart illustrating the challenge-response authentication routine performed by the first computer to authenticate the second computer.

FIG. 2 is a flow chart illustrating the challenge-response authentication routine performed by the first computer 102 to authenticate the second computer 104. It is assumed in this embodiment that the steps illustrated in FIG. 2 are performed under the direction of the authentication program 116. As shown in FIG. 2, the authentication program 116 begins the authentication task by generating a challenge block (step 202). This step may be accomplished using standard techniques. As indicated above, in this embodiment it is assumed that the challenge block is generated by using the standard public key crypto algorithm previously agreed to by party A and party B.

Next, an SNMP SetRequest message is generated (step 204) and transmitted (step 206) to the second computer 104. As is well known in the art, an SNMP SetRequest message may be used to set an object to a new value. In this case the SetRequest message is used to set the authenticate object 164 to the challenge block value. Accordingly, the SetRequest message includes a variable-bindings field that includes the object identifier (OID) for the authenticate object 164 and the challenge block as the new value for the authenticate object 164.

Figure 3:
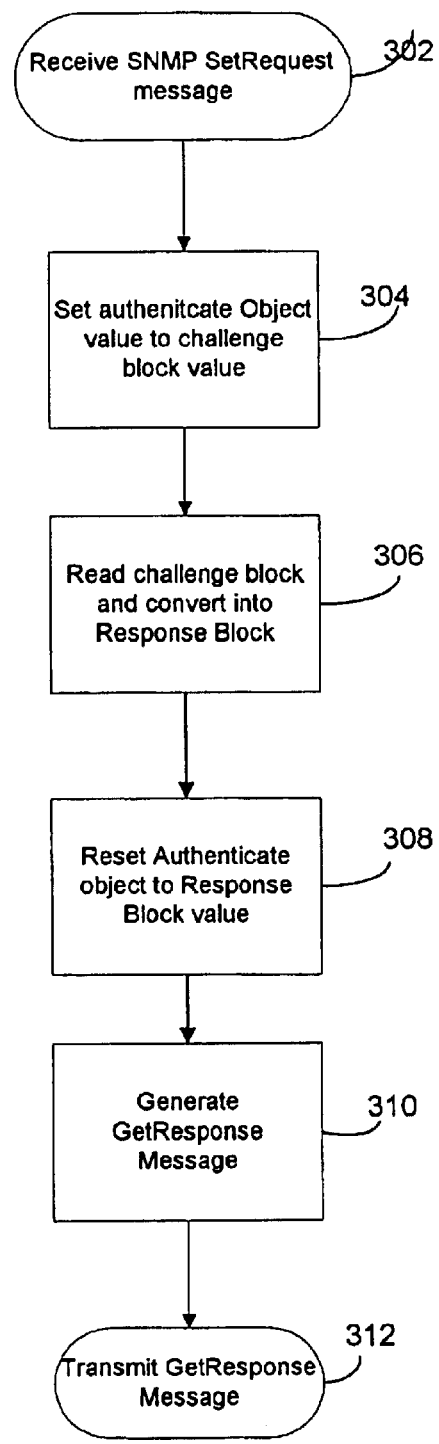
FIG. 3 is a flow chart illustrating the steps followed by the second computer in response to receiving a challenge from the second computer.

FIG. 3 is a flow chart illustrating the steps followed by the second computer 104 in response to receiving the SetRequest message. As shown in FIG. 3, upon receiving the SetRequest message (starting step 302), the SNMP agent 162 operates in a standard manner to set the value of the authenticate object 164 to the challenge block value (step 304).

As indicated above, this results in the execution of the response program 166. The response program 166, in response to the authenticate object being set to a new value, reads the challenge block (i.e., the current value of the authenticate object 164) and converts it into a response block (step 306). The conversion of the challenge block to the response block is performed in a standard manner by using the public key crypto algorithm and the private key 168. After the response block is generated, the response program 166 re-sets the authenticate object 164 to the response block value (step 308).

After the response program 166 re-sets the authenticate object 164 to the response block value, the SNMP agent 162 generates a GetResponse message (step 310) and transmits the GetResponse message back to the first computer 102 (step 312). Importantly, because the authenticate object 168 was reset to the response block value, the GetResponse message variable-bindings field includes the response block value (i.e., the current value of the authenticate object 164). Thus, in this manner, the response block is passed back to the first computer 102.

Referring again to FIG. 2, the operation of the first computer 102 after transmitting the SetRequest message is now further discussed. Upon transmitting the SetRequest (step 206) to the second computer 104, the authenticate program 116 waits for a pre-determined amount of time to receive an appropriate response from the second computer 104. (i.e., the GetResponse message generated in step 310 of FIG. 3). If the GetResponse is not received (decision step 208) before the time out period has tolled (decision step 210) then it is determined that the second computer 104 is not an authorized party (ending step 214) and the authentication task is complete. As a result, party A does not have confidence that computer 104 is in possession of the private key 168. As a result, the data (mentioned above) intended for party B's computer is not transferred.

If, however, a GetResponse message having the authenticate OID is received from the second computer 104 before the time out period has tolled (decision step 208) then the authentication program 116 determines from this message whether the second computer 104 is an authorized party (decision step 212). This is accomplished by first parsing the message to identify the response block. After the response block is identified it is then verified using standard techniques to determine if the second computer 104 is in possession of the private key 168. In this embodiment, this is accomplished by again using the public key crypto algorithm and the public key 114.

If the authentication program 116 does not verify the response block, a determination is made (decision step 212) that the second computer 104 is not an authorized party (step 214) and the data intended for party B's computer is not transferred.

If, however, the authentication program 116 does verify the response block, then the authorization program determines that the second computer 104 is an authorized party. In that case, party A determines (within a certain degree of certainty) that computer 104 is indeed in possession of the private key 168 (step 216). As a result, the data intended for party B's computer is transferred.

It is noted that in the embodiment just described, the functionality provided by any one of the programs (e.g., the authenticate program 116, the SNMP agent 162 and the response program 166) described above may alternatively be provided in whole or in part by hardware components. For example, one or more of the steps illustrated in FIG. 2 or FIG. 3 could be performed by operation of an application specific integrated circuit having appropriate logic gates, a programmable gate array (s) (PGA) or a field programmable gate array (FPGA). It is also noted that in alternative embodiments of the present invention, the steps indicated in FIG. 2 and FIG. 3 may occur out of the order indicated in these figures. For example, two steps shown in succession may be executed substantially concurrently or in reverse order.

The present invention may also be embodied in the form a program storage medium having computer readable program code embodied therein for causing a computer to perform one or more of the steps indicated in FIG. 2 and FIG. 3. In the context of this document, "program storage medium" can be any means that can contain, store, communicate, propagate, or transport the program for use by or in connection with an instruction execution system, apparatus or device. The program storage medium can be, for example (the following is a non-exhaustive list), a magnetic, optical, or semiconductor based storage device.

It is further noted that as previously stated the computers (i.e., the first computer 102 and the second computer 104) depicted in FIG. 1 may represent any device that is addressable over a network. For example, in some implementations the second computer 104 is a printer and the data party A wishes to transmit to party B's printer (i.e., the second computer 104) is print data which is used to cause party B's printer to print one or more documents.

From the foregoing it will be appreciated that the present invention represents a significant advance in the art. The present invention provides a way to perform challenge-response authentication by using a network management protocol. Typically, a network computer will include such a protocol for the primary purpose of achieving network management. Thus, on such a computer challenge-response authentication can be achieved without having to add the additional software associated with a prior art challenge-response protocol. As a result, system overhead and costs can be reduced.

Although specific embodiments of the invention has been described and illustrated, the invention is not to be limited to the specific forms or arrangements of parts so described and illustrated. For example, in the embodiments described above, the invention was implemented by using SNMP. The present invention may also be implemented by using another type of network management protocol that allows for the management of objects in the same or similar manner as SNMP. In addition, any version of SNMP may be used to implement the invention. Accordingly, the invention is limited only by the claims and equivalents thereof.

What is claimed is:

1. In a computer that includes a MIB object, a method comprising:
   (a) receiving a first SNMP message from an external computer, where the message includes an identifier of the MIB object and a challenge block value;
   (b) setting the MIB object to the challenge block value;
   (c) using a private key to convert the challenge block value to a response block value;
   (d) re-setting the MIB object to the response block value; and
   (e) transmitting a second SNMP message that includes the response block value to the external computer.

2. The method of claim 1, wherein the external computer receives the second SNMP message and uses the response block value included in the second SNMP message to verify that the computer that includes the MIB object is in possession of the private key.

3. The method of claim 1, wherein the external computer receives the second SNMP message and uses the response block value to determine if the computer that includes the MIB object is an authorized party.

4. The method of claim 2, wherein the first SNMP message is a SetRequest message and the second SNMP message is a GetResponse message.

5. The method of claim 3, wherein the computer that includes the MIB object is a printer.

6. In a printer that includes a MIB object and connected to a network, a method comprising:
   receiving an SNMP GetResponse message from a computer external to the printer, where the GetResponse message includes an identifier of the MIB object and a challenge block value;
   setting the MIB object to the challenge block value;
   using a previously stored private key to convert the challenge block value to a response block value;
   re-setting the MIB object to a response block value;
   transmitting an SNMP SetRequest message to the computer, where the SetRequest message includes the response block value; and
   wherein the external computer uses the response block value included in the SetRequest message to determine that the printer is an authorized party on the network.

7. The method of claim 6, wherein the transmitting act is performed in response to the MIB object being re-set to the response block value.

8. A method of indicating that a printer that includes a MIB is an authorized party on a network, comprising,
   (a) receiving a SetRequest Message that includes a challenge block value and an identifier of an object in the MIB;
   (b) setting the object to the challenge block value;
   (c) converting the challenge block value to a response block value using a previously stored private key;
   (d) re-setting the object to the response block value;
   (e) transmitting a GetResponse message to a computer;
      wherein the GetResponse message includes the identifier of the object and the response block value;
      wherein the response block value indicates the printer is presently in possession of the private key and is therefore an authorized party.

9. The method of claim 8, wherein the printer performs acts (a)–(e).

10. The method of claim 9, further comprising:
    (f) receiving the GetResponse message from the printer;
    (g) parsing the GetResponse message to identify the response block value;
    (h) determining, from the response block value, if the printer is an authorized party; and
    wherein the computer performs acts (f)–(h).

11. The method of claim 9, further comprising:
    (f) receiving, by the computer, the GetResponse message from the printer;
    (g) determining from the response block value included in the GetResponse message whether the printer is an authorized party; and
    (h) if the printer is determined to be an authorized party, then transmitting print data to the printer.

12. A method of determining whether to transmit data to a computer, comprising:
    (a) transmitting, to the computer, an SNMP SetRequest message that includes a MIB object identifier and a challenge block value;
    (b) determining if an SNMP GetResponse message that includes both the MIB object identifier and a response block value is received from the computer, where the response block value indicates the computer is in possession of a private key;
    (c) if the SNMP GetREsponse message is received, then evaluating the response block value included in the SNMP GetResponse message to determine if the computer is an authorized party; and
    (d) if the computer is determined to be an authorized party, then transmitting the data to the computer.

13. The method of claim 12, wherein the data is print data and the computer is a printer.

14. The method of claim 12, wherein if the evaluating act concludes that the printer is not an authorized party, then the transmitting act is not performed.

15. A method of determining whether to transmit print data to a printer connected to a network, comprising:
    (a) transmitting a first SNMP message to the printer, the first $NMP message including an identifier of a MIB object and a challenge block value;
    (b) receiving a second SNMP message from the printer that includes the MIB object identifier and a response block value;
    (c) verifying the response block value to determine if the printer is an authorized party; and
    (d) if the response block is verified, then transmitting the print data to the printer.

16. In a system that includes a first computer and a second computer that includes a MIB object, a method comprising:
    (a) receiving, by the second computer, a first SNMP message where the first SNMP message includes both an identifier of the MIB object and a challenge block value;

(b) setting, by the second computer, the object to the challenge block value;

(c) using, by the second computer, a private key to convert the challenge block value to a response block value;

(d) re-setting, by the second computer, the MIB object to the response block value;

(e) transmitting, by the second computer, a second SNMP message that includes the identifier and the response block value to the computer;

(g) receiving, by the first computer, the second SNMP message; and (h) determining, by the first computer, from the response block value included in the second SNMP message if the printer is an authorized party.

17. The method of claim 16, wherein the second computer is a printer.

18. The method of claim 17, further comprising:

(i) transmitting print data to the printer; and
wherein act (i) is performed only if the printer is determined to be an authorized party.

19. The method of claim 18, further comprising:

(j) receiving, by the printer, the print data; and (k) printing, by the printer, the print data.

20. A system, comprising:

a first computer connected to a network;

a second computer also connected to the network and including a memory that stores a private key and an authentication MIB object;

wherein the first computer includes means for transmitting a SetRequest message to the second computer, where the SetRequest message includes an object identifier assigned to the authentication MIB object and a challenge block;

wherein the second computer includes means for responding to the SetRequest message by:

setting the MIB object to the challenge block value;

converting, by use of the private key, the challenge block value to a response block value;

re-setting the MIB object to the response block value; and transmitting a GetResponse message to the first computer, where the GetResponse message includes the object identifier and the response block value.

21. The system of claim 20, wherein the first computer further includes means for processing the GetResponse message to determine if the second computer is an authorized party on the network.

* * * * *

UNITED STATES PATENT AND TRADEMARK OFFICE
CERTIFICATE OF CORRECTION

PATENT NO.      : 6,820,124 B1
DATED           : November 16, 2004
INVENTOR(S)     : James Clough It is certified that error appears in the above-identified patent and that said Letters Patent is hereby corrected as shown below:

<u>Column 8,</u>
Line 53, delete "$NMP" and insert therefore -- SNMP --.

Signed and Sealed this

Twenty-ninth Day of November, 2005

JON W. DUDAS
*Director of the United States Patent and Trademark Office*